US012697998B1

(12) United States Patent
Maciolek et al.

(10) Patent No.: US 12,697,998 B1
(45) Date of Patent: Aug. 4, 2026

(54) MOTOR VEHICLES WITH BLIND SPOT MODELING

(71) Applicant: UIPCO, LLC, San Antonio, TX (US)

(72) Inventors: Michael J. Maciolek, Kerrville, TX (US); Donnette L. Moncrief Brown, San Antonio, TX (US); Manfred Amann, San Antonio, TX (US); Snehal Desai, Richardson, TX (US); Nicole Ferretti, Plano, TX (US); Melissa Jane Porter, Lutz, FL (US); Sayeef Rahim, Frisco, TX (US); Andrew Logan Taylor, San Antonio, TX (US); Martin Lopez, Frisco, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 77 days.

(21) Appl. No.: 18/756,612

(22) Filed: Jun. 27, 2024

Related U.S. Application Data

(60) Provisional application No. 63/511,237, filed on Jun. 30, 2023.

(51) Int. Cl.
| | |
|---|---|
| *B60W 60/00* | (2020.01) |
| *B60Q 9/00* | (2006.01) |
| *B60W 30/16* | (2020.01) |
| *B60W 30/18* | (2012.01) |
| *B60W 50/14* | (2020.01) |

(52) U.S. Cl.
CPC ............. *B60W 60/001* (2020.02); *B60Q 9/00* (2013.01); *B60W 30/16* (2013.01); *B60W*

*30/18163* (2013.01); *B60W 50/14* (2013.01); *B60W 2420/403* (2013.01); *B60W 2420/408* (2024.01);

(Continued)

(58) Field of Classification Search
CPC .............. B60W 60/001; B60W 30/16; B60W 30/18163; B60W 50/14; B60W 2420/403; B60W 2420/408; B60W 2540/227; B60W 2754/50; B60Q 9/00
See application file for complete search history.

(56) References Cited

U.S. PATENT DOCUMENTS

| | | | | |
|---|---|---|---|---|
| 10,836,376 B2 * | 11/2020 | Wodrich | ............... | B60W 30/02 |
| 2015/0321699 A1 * | 11/2015 | Rebhan | ........... | B60W 30/18163 |
| | | | | 701/23 |

(Continued)

FOREIGN PATENT DOCUMENTS

WO      WO-2018029003 A1 *  2/2018  ............. G06V 20/56

*Primary Examiner* — Navid Z. Mehdizadeh
*Assistant Examiner* — Caitlin R Mccleary
(74) *Attorney, Agent, or Firm* — Plumsea Law Group, LLC

(57) ABSTRACT

Systems and methods for proactively monitoring when a driver's own motor vehicle may enter into the blind spot of another vehicle include a blind spot modeling system that identifies and builds models of nearby vehicles. The models, which include details about the vehicle mirrors, including their locations and orientations, are used to determine visible regions or zones and regions are zones that are not visible to the driver from the mirrors (blind spots). The blind spot modeling system may take action when the driver's own vehicle is in another vehicle's blind spot, including sending the driver alerts and/or modifying the operation of one or more vehicle systems to automatically move the driver's vehicle out of the blind spot of the other vehicle.

20 Claims, 8 Drawing Sheets

(52) U.S. Cl.
CPC ... *B60W 2540/227* (2020.02); *B60W 2754/50*
(2020.02)

(56)                    References Cited

U.S. PATENT DOCUMENTS

| 2018/0326905 | A1* | 11/2018 | Nakata | .................... | B60Q 9/008 |
| 2018/0341821 | A1* | 11/2018 | Hovis | .................. | G08G 1/0968 |
| 2019/0088138 | A1* | 3/2019 | Kang | .................... | B60W 10/20 |
| 2021/0166564 | A1* | 6/2021 | Takaki | .................... | G08G 1/166 |
| 2022/0063621 | A1* | 3/2022 | Austin | ................. | G06V 20/584 |
| 2023/0055862 | A1* | 2/2023 | Hamada | ................. | G06V 20/56 |

* cited by examiner

WARNING: YOU ARE CURRENTLY IN THE BLINDSPOT OF THE IDENTIFIED VEHICLE

MOTOR VEHICLES WITH BLIND SPOT MODELING

CROSS-REFERENCE TO RELATED APPLICATIONS

This application claims the benefit of Provisional Patent Application No. 63/511,237 filed Jun. 30, 2023, and titled "Motor Vehicles with Blind Spot Modeling," which is incorporated by reference herein in its entirety.

TECHNICAL FIELD

The present disclosure generally relates to vehicles, and in particular, to systems and methods for identifying blind spots with motor vehicles.

BACKGROUND

Modern motor vehicles may be equipped with blind spot warning systems to warn a driver of a motor vehicle anytime another vehicle is in the driver's own blind spot. These systems use sensors to detect the presence of vehicles in areas that are not visible to the driver using the vehicle's mirrors. However, blind spot warning systems are not equipped to help the driver identify situations in which the driver's own vehicle may be in the blind spot of another motor vehicle so that the driver can proactively respond.

There is a need in the art for a system and method that addresses the shortcomings discussed above.

SUMMARY

In some aspects, the techniques described herein relate to a motor vehicle, including: one or more sensors; a vehicle safety system, further configured to: receive data for a target vehicle from the one or more sensors; build a computer model of the target vehicle using the received data, wherein the computer model includes at least one model mirror; determine a blind spot zone for the target vehicle using the computer model of the target vehicle including the at least one model mirror; determine a position of the motor vehicle relative to the target vehicle and determine that the motor vehicle is in the blind spot zone of the target vehicle; and alert a driver of the motor vehicle that the motor vehicle is in the blind spot zone of the target vehicle.

In some aspects, the techniques described herein relate to a motor vehicle, including: one or more sensors; a vehicle safety system, further configured to: receive data for a target vehicle from the one or more sensors; build a computer model of the target vehicle using the received data, wherein the model includes at least one model mirror; determine a blind spot zone for the target vehicle using the computer model of the target vehicle including the at least one model mirror; determine a position of the motor vehicle relative to the target vehicle and determine that the motor vehicle is in the bling spot zone of the target vehicle; and modify the operation of the motor vehicle to move the vehicle out of the blind spot of the target vehicle.

In some aspects, the techniques described herein relate to a method for a safety system of a motor vehicle, the method including: receiving data for a target vehicle from one or more sensors; building a computer model of the target vehicle using the received data, wherein the model includes at least one model mirror; determining a blind spot zone for the target vehicle using the computer model of the target vehicle including the at least one model mirror; determining a position of the motor vehicle relative to the target vehicle and determining that the motor vehicle is in the blind spot zone of the target vehicle; and controlling a vehicle system of the motor vehicle.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

The embodiments provide systems and methods for proactively monitoring when a driver's own motor vehicle may enter into the blind spot of another vehicle. The systems and methods include a blind spot modeling system that identifies and builds models of nearby vehicles. The models, which include details about the vehicle mirrors, including their locations and orientations, are used to determine visible regions or zones and regions are zones that are not visible to the driver from the mirrors (blind spots). The blind spot modeling system may take action when the driver's own vehicle is in another vehicle's blind spot, including sending the driver alerts and/or modifying the operation of one or more vehicle systems to automatically move the driver's vehicle out of the blind spot of the other vehicle.

As used herein, the term "motor vehicle" may refer to various kinds of vehicles having either engines (that is, gas powered vehicles) and/or electric motors (that is, electrically powered vehicles). Exemplary vehicles include, but are not limited to, cars, trucks, motorcycles, electric scooters, and other suitable vehicles. In some embodiments, vehicles could include planes, helicopters, drones, and other aerial vehicles, as well as boats.

Figure 1:
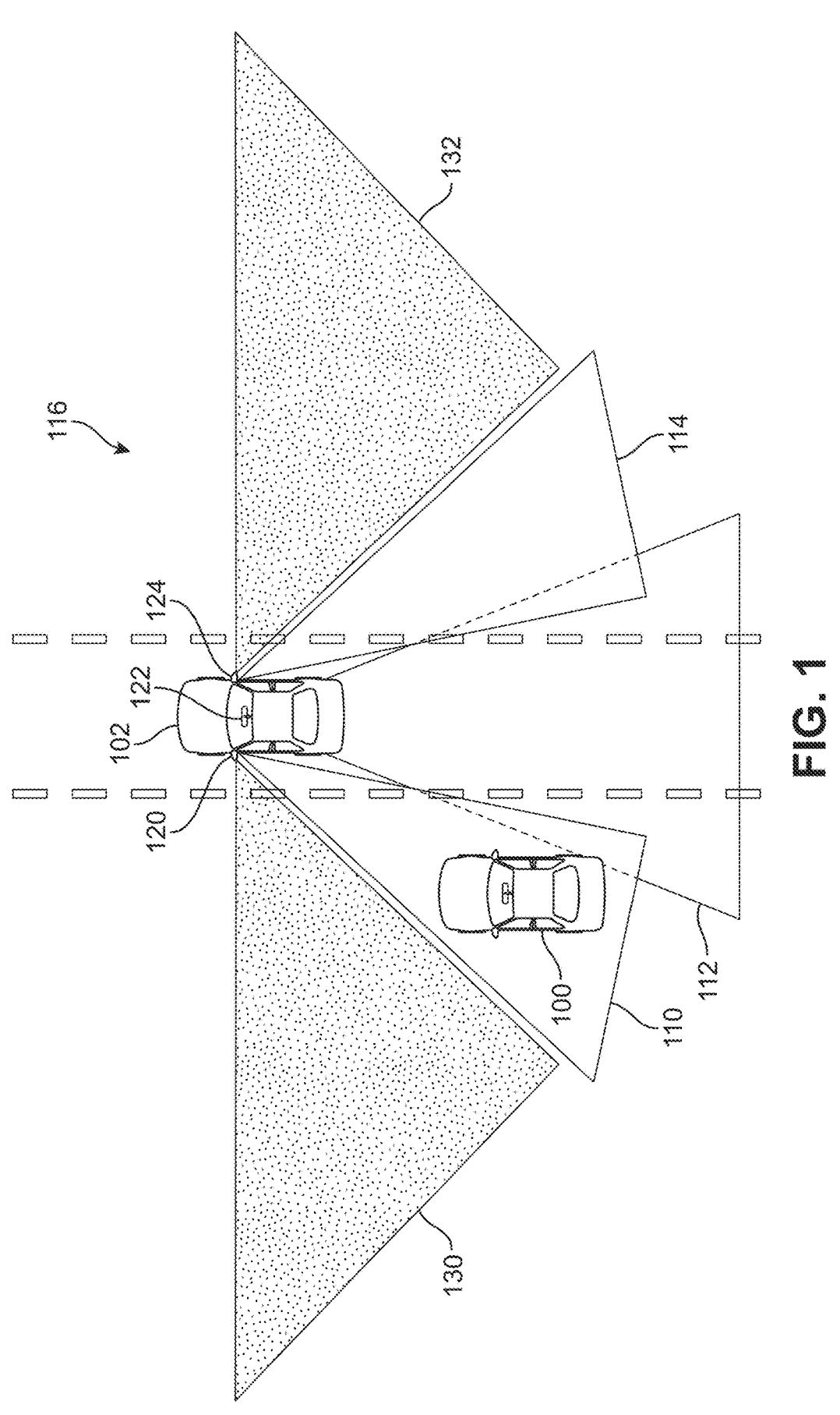
FIGS. 1-2 are schematic views demonstrating a process of alerting a driver whenever the driver's own vehicle enters a blind spot of another vehicle, according to an embodiment.
Figure 2:
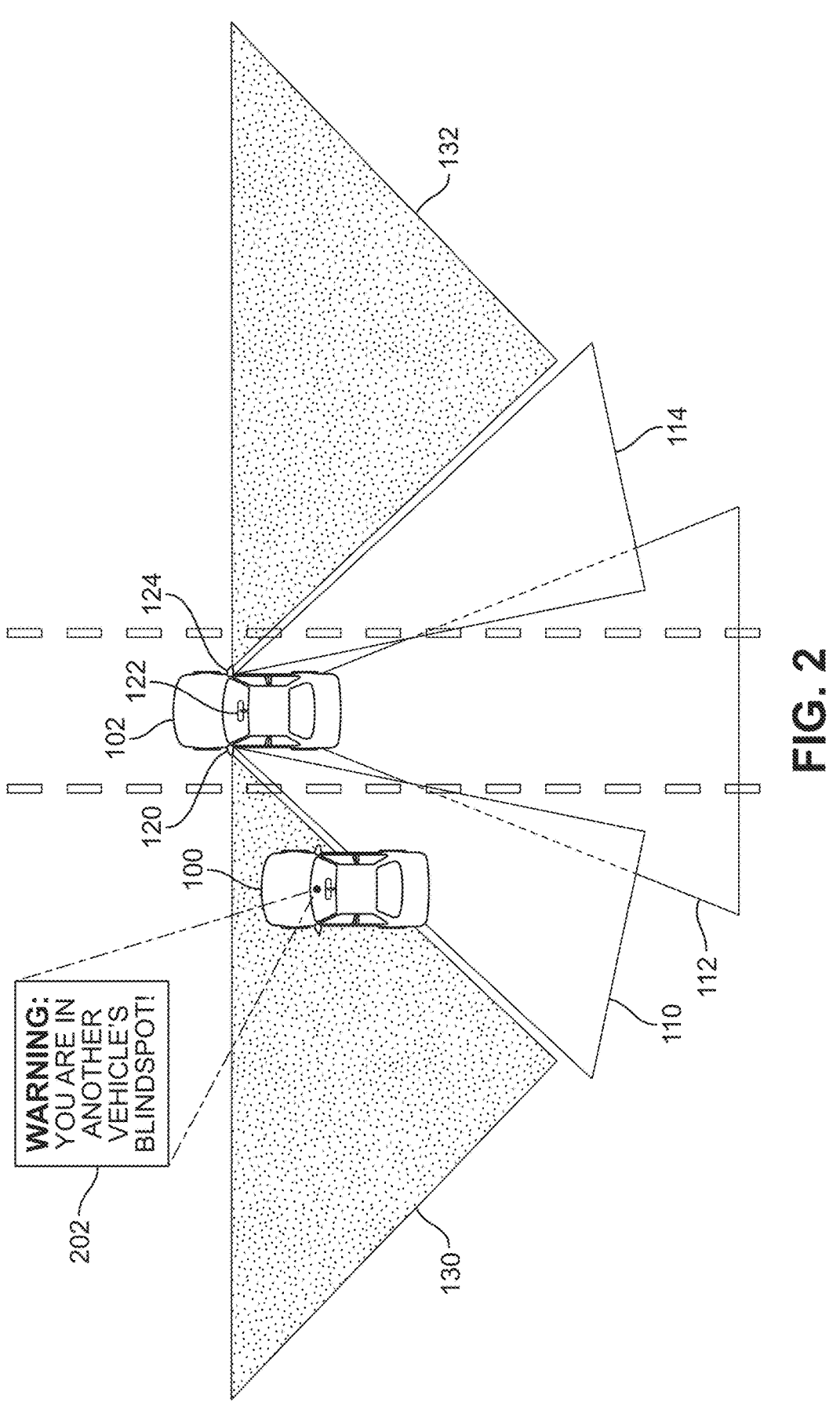

FIGS. 1-2 are schematic views demonstrating how the exemplary systems and methods may facilitate alerting a driver whenever the driver's own vehicle enters a blind spot of another vehicle.

As shown in FIG. 1, another vehicle, also referred to as a "target vehicle," is shown schematically along with several indicated zones. These zones include rearward visibility zones and rearward blind spot zones (or simply "blind spots"). A rearward visibility zone is any zone or region behind a vehicle that may be visible to a driver by looking in one of the vehicle's mirrors. A rearward blind spot zone, or blind spot, is any zone or region behind a vehicle that may not be visible to a driver by looking in any of the vehicle's mirrors. Typically, to get a view of any objects in one of the blind spot zones, the driver must look backwards or rely on views from rearward facing cameras.

In the example of FIG. 1, target vehicle 102 is associated with a first rearward visibility zone 110, a second rearward visibility zone 112, and a third rearward visibility zone 114, which may have some overlap. These zones are associated with corresponding mirrors, such as first side mirror 120 for first rearward visibility zone 110, rearview mirror 122 for second rearward visibility zone 112, and second side view mirror 124 for third rearward visibility zone 114.

Areas not covered by either the driver's forward peripheral vision (peripheral visibility zone 116) or any of the remaining rearward visibility zones comprise blind spot zones. These include a first blind spot zone 130 and a second blind spot zone 132. In different configurations for mirrors in a vehicle, a vehicle could have additional rearward blind spot zones. Moreover, it may be appreciated that the number, size, and shape of blind spots zones may depend on various factors including the number, size, shape, position, and orientation of side and rearview mirrors, the position of a driver in the vehicle cabin, as well as features of the vehicle that may obscure the driver's view such as pillars and other portions of the vehicle frame.

As shown in FIG. 1, a motor vehicle 100 is located within first rearward visibility zone 110, so that motor vehicle 100 should be visible to a driver of target vehicle 102 when that driver looks in first side mirror 120. As motor vehicle 100 moves from first rearward visibility zone 110 to first blind spot zone 130, as in FIG. 2, motor vehicle 100 may no longer be visible to a driver of target vehicle 102 in any of the vehicle's mirrors. In other words, in FIG. 2, motor vehicle 100 is located within one of the driver's (or vehicle's) blind spots, presenting possible safety issues for both vehicles.

As shown in FIG. 2, motor vehicle 100 includes a safety system that proactively identifies when motor vehicle 100 is in a blind spot zone of the driver of target vehicle 102. Moreover, the safety system provides an alert 202 to the driver of motor vehicle 100, so that the driver of motor vehicle 100 can take actions to move out of the blind spot and into an area more readily visible by the driver of target vehicle 102. As described in further detail below, in some cases, the safety system may activate one or more additional vehicle systems that may facilitate automatically moving motor vehicle 100 out of the blind spot of target vehicle 102.

Figure 3:
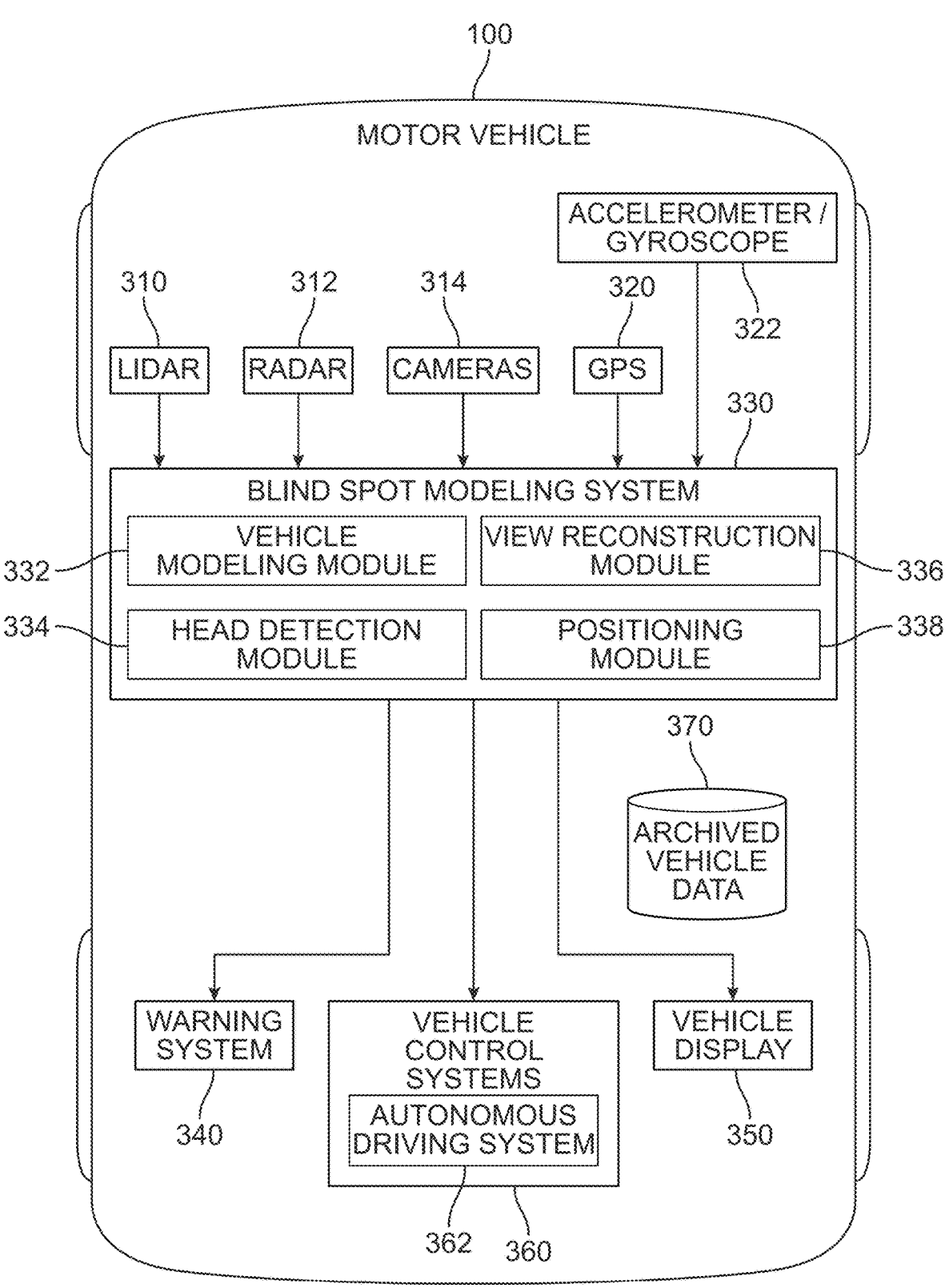
FIG. 3 is a schematic view of a motor vehicle, including systems and components that facilitate blind spot modeling, according to an embodiment.

FIG. 3 is a schematic view of motor vehicle 100, including systems and components that facilitate the safety features illustrated in FIGS. 1-2. In particular, the exemplary components and systems facilitate identifying blind spot zones for one or more target vehicles in the vicinity of motor vehicle 100, and for taking appropriate actions such as alerting the driver or even taking automated control of one or more systems to move the vehicle away from the identified blind spot zones.

Motor vehicle 100 may include a plurality of sensors, which detect various kinds of information. These sensors may include, but are not limited to, gyroscopes, velocity sensors (such as wheel speed sensors), acceleration sensors, steering angle sensors, throttle opening sensors, gear state sensors, brake system sensors (including brake pedal sensors), Light Detection and Ranging ("LIDAR") sensors, Radar sensors and optical sensors (cameras). In the exemplary embodiment of FIG. 3, motor vehicle 100 includes LIDAR 310, radar 312, and cameras 314. Cameras 314 may comprise one or more vehicle cameras including various exterior cameras that provide views in multiple directions. Likewise, LIDAR 310 and radar 312 may be configured to capture LIDAR and radar data from multiple different directions around a vehicle. In some cases, one or more of LIDAR 310, radar 312 and cameras 314 may capture a full 360 degree view around motor vehicle 100.

Motor vehicle 100 may also include a GPS (Global Positioning System) device 320. GPS device 320 may comprise any suitable device capable of receiving GPS signals and determining a GPS position for motor vehicle 100. In other cases, any other suitable device for capturing GNSS (Global Navigation Satellite System) data can be used for the purposes of determining a motor vehicle's position.

Motor vehicle 100 may include an accelerometer and/or gyroscope 322 for determining acceleration, orientation, or other suitable information about motor vehicle 100. As discussed above, other sensors could be used including wheel speed sensors, throttle sensors, steering angle sensors, and brake pedal sensors.

Motor vehicle 100 may include a vehicle safety system that helps identify when motor vehicle 100 has entered into the blind spot of another (target) vehicle. In one embodiment, motor vehicle 100 comprises a blind spot modeling system 330 (or simply "modeling system 330"). Modeling system 330 may include provisions for identifying target vehicles, building models of the target vehicles and/or surrounding features of a vehicle's environment, identifying blind spot zones around any target vehicles, and for determining when the motor vehicle is in the blind spot of a target vehicle.

Modeling system 330 may further include a vehicle modeling module 332, a head detection module 334, a view reconstruction module 336, and a positioning module 338. Vehicle modeling module 332 may comprise any suitable algorithms for identifying, from sensor data (such as LIDAR and/or camera data), target vehicles and/or their respective components (such as windows, mirrors, and vehicle frames) and for generating suitable models of the target vehicles.

Head detecting module 334 may comprise any suitable algorithms for detecting, from sensor data, the head of a driver of a target vehicle. Moreover, head detection module 334 may include suitable algorithms for determining a position of the driver's head relative to other portions of the target vehicle, as well as the orientation of the head.

View reconstruction module 336 may comprise any suitable algorithms for determining the areas or "zones" that may be visible to a driver in one or more mirrors of a target vehicle.

Positioning module 338 may comprise suitable algorithms for identifying the approximate location of the motor vehicle with respect to the target vehicle, and especially with respect to the various visibility zones and blind spot zones next to and behind the target vehicle.

Motor vehicle 100 may also include various vehicle systems that receive information from modeling system 330. Motor vehicle 100 may include a warning system 340. Warning system 340 may be any system capable of providing alerts to a driver whenever the motor vehicle has entered a blind spot zone of a target vehicle. In some cases, the alerts could be provided audibly. In other cases, the alerts could be provided via visual icons on a dashboard and/or via messages displayed on a vehicle display 350 of motor vehicle 100. In still other cases, alerts could be sent to a driver's phone or wearable device.

Motor vehicle 100 may also include one or more vehicle control systems 360. Vehicle control systems 360 comprise various systems that are responsible for facilitating driving, safety, or other functions that affect the behavior of the motor vehicle. Exemplary vehicle control systems may include, but are not limited to systems for engine/motor control, steering control, transmission control, and braking control. Vehicle control systems 360 may also include one or more vehicle safety systems, such as anti-lock braking systems, lane departure warning systems, and automatic emergency braking. Vehicle control systems 360 may also include an autonomous driving system 362, which may provide autonomous driving capabilities for motor vehicle 100. In particular, autonomous driving system 362 may be capable of monitoring information from sensors (such as video from a camera and information from a LIDAR device) and autonomously controlling motor vehicle 100 to move out of the blind spot zone of a nearby target vehicle.

In some embodiments, motor vehicle 100 may further include archived vehicle data 370. In some cases, vehicle data 370 may include pre-constructed 2-dimensional and/or 3-dimensional models of various makes and models of motor vehicles. These models could be used for reconstructing blind spots as described in further detail below. In other cases, vehicle data 370 may include various kinds of data for vehicles of various makes and models, which data may be used in constructing models of any target vehicles. As one clarifying example, archived vehicle data 370 may store information about the position and dimensions of one or more mirrors in a vehicle of a particular make and model. Once the target vehicle has been identified, this archived vehicle data can be used in constructing a model of the target vehicle in order to determine blind spots for the target vehicle.

As shown schematically in FIG. 3, the flow of data may go from sensors, which provide sensed data, to modeling system 330. In some cases, modeling system 330, upon detecting that a motor vehicle has entered the blind spot of another vehicle, may send information to trigger other vehicle systems to take further actions. For example, modeling system 330 may send instructions or other information to one or more vehicle systems (including warning system 340, vehicle display 350, and/or vehicle control systems 360).

It may be appreciated that each of the components, systems, and modules shown in the Figures and described herein may be implemented on one or more onboard units (OBUs). Each OBU comprises a computing system with one or more processors as well as a non-transitory computer readable medium (memory) that stores instructions to be executed by the one or more processors. Moreover, each of the components, systems, and/or the motor vehicle itself may include suitable communication components, such as wireless networking components.

In other embodiments, not all components may be integrated into a motor vehicle. For example, in other embodiments, a blind spot modeling system may be implemented on a separate computing system, which may be in communication with one or more components of a motor vehicle. In another exemplary embodiment, a driver may use a mobile phone with mobile software applications that implement one or both of these systems.

Moreover, while various sensors are shown as residing on/within motor vehicle 100, in other embodiments sensory input could also be received from sensors from other sources. For example, velocity, acceleration, and other kinds of motion data could be obtained from sensors within a driver's phone. As another example, images of a vehicle moving along a street or through some other space could be captured using external cameras (for example, red light cameras, parking garage cameras, or other suitable external cameras).

Figure 4:
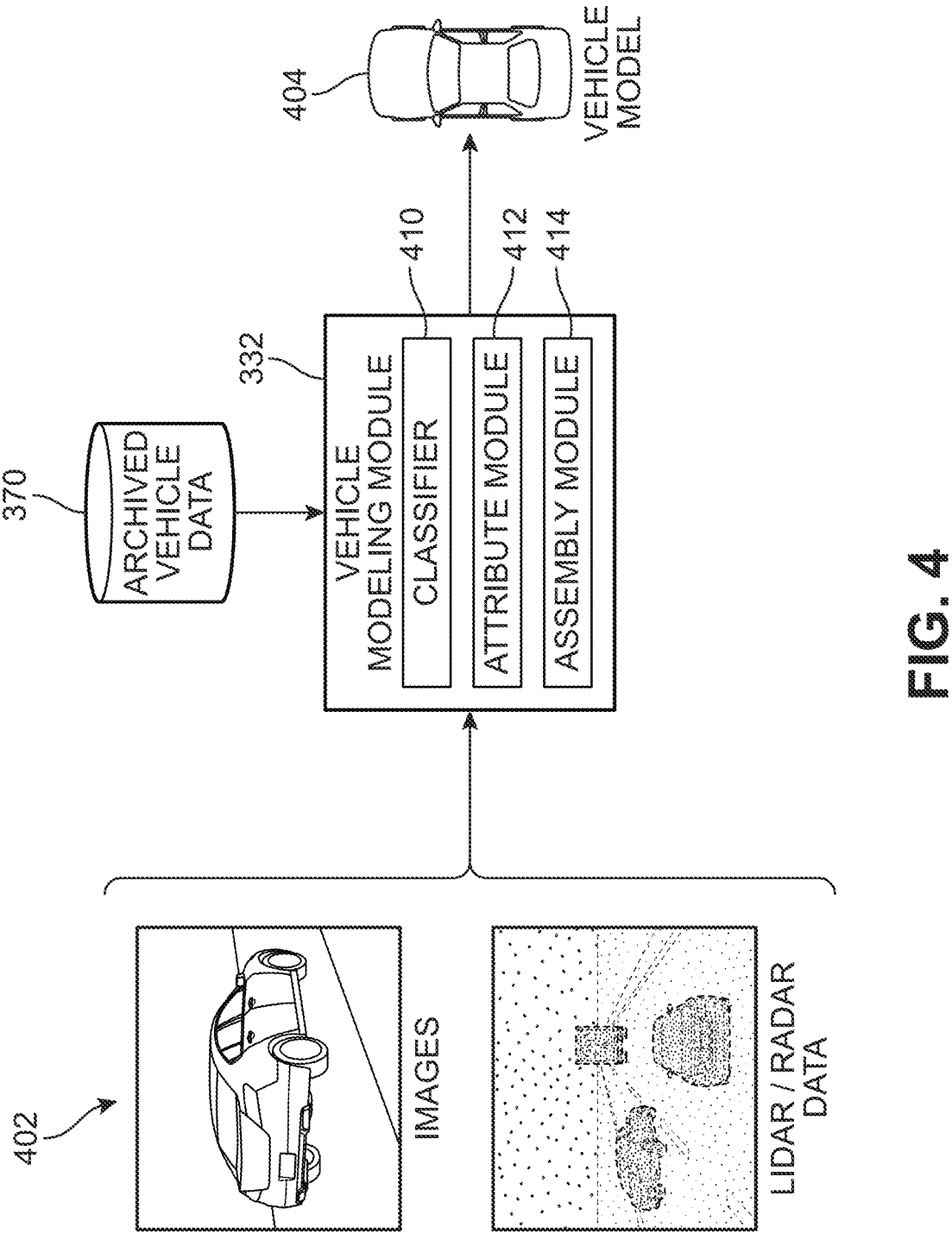
FIG. 4 is a schematic view showing the operation of an identification module, according to an embodiment.

FIG. 4 is a schematic view showing an exemplary architecture for vehicle modeling module 332. Vehicle modeling module 332 operates to identify, from sensed data, a target vehicle and/or individual component parts of a vehicle (such as windows, mirrors, pillars, and other parts). Vehicle modeling module 332 may also determine attributes for the target vehicle and/or component parts. The attributes may then be used in constructing a model of the target vehicle.

As seen in FIG. 4, vehicle modeling module 332 may receive inputs 402 including visual images as well as LIDAR and/or radar data captured by sensors for one or more target vehicles. For example, vehicle modeling module 332 may receive images and LIDAR data for a target vehicle driving ahead of a motor vehicle.

Vehicle modeling module 332 may include classifier 410 for identifying a vehicle's make, model, and year. Classifier 410 may also identify component parts (windows, mirrors, and frame/pillars) of the vehicle. In some cases, classifier 410 could comprise one or more computer vision algorithms for object detection, recognition, and/or identification. In some cases, classifier 410 may include one or more convolutional neural networks (CNNs) or suitable transformer neural networks for identifying target vehicles and particular portions of the vehicles from sensed data.

The identified information output by classifier 410 may be fed to attribute module 412. Attribute module 412 may utilize archived vehicle data 370 and/or sensed data to generate vehicle modeling data. As used herein, the term vehicle modeling data includes any data that may be used to build a 2-dimensional and/or 3-dimensional model of a target vehicle. This may include the dimensions, shape, orientation, and location of each part. In cases where archived vehicle model data is available, for a particular make, model, and year, static data such as the size, shape and relative location of parts can be extracted from the archived vehicle model data. In cases where archived vehicle model data is not available, some of these attributes may be determined from direct sensing, for example using LIDAR ranging data to infer the size, shape, and locations of various vehicle parts. Even when archived data is available, it may be necessary to use sensed data to determine the orientation of one or more mirrors as well as other dynamic data.

Using the identified components (either the entire vehicle and/or some component parts) and their respective attributes, an assembly module 414 may be used to construct a final vehicle model 404. Model 404 could be any suitable 2-dimensional or 3-dimensional model. Assembly module 414 may comprise any suitable algorithms for building two-dimensional or three-dimensional models of a target vehicle, including modeled components of the target vehicle, as well as models of other entities such as the motor vehicle itself, based on provided information. As an example, suitable 2D and/or 3D CAD (computer aided design) software could be used to build accurate models of a target vehicle, including features such as windows, vehicle frames, and mirrors, which are all relevant to modeling blind spots in vehicles. Alternatively, a static model of a full vehicle could be extracted from archived vehicle model data and then modified with dynamic (sensed) properties such as the orientation of each mirror in the target vehicle.

Model 404 may include various modeled parts such as a modeled vehicle frame (or portion of a vehicle frame, such as one or more pillars), modeled mirrors (such as a modeled driver side view mirror, a modeled passenger side view mirror, and a modeled rearview mirror), as well as modeled windows (including a modeled windshield, a modeled rear window, and modeled side windows).

Embodiments may optionally include head detection module 334, as discussed above. Head detection module 334 may use sensed data to identify a driver's head, as well as to determine a current location and orientation of the head. In some embodiments, head detection module 334 may also include a classifier for detecting a driver's head, as well an attribute model for inferring, based on sensed data, the location of the head as well as its orientation. In some cases, the location and orientation of the head may be determined by analyzing LIDAR and/or radar data. In other cases, the location and orientation of the head may be determined from camera images that may be further analyzed using suitable machine vision algorithms to determine an approximate location and orientation of the head. The outputs of head detection module 334 may be provided along with vehicle model data, to view reconstruction module 336.

Figure 5:
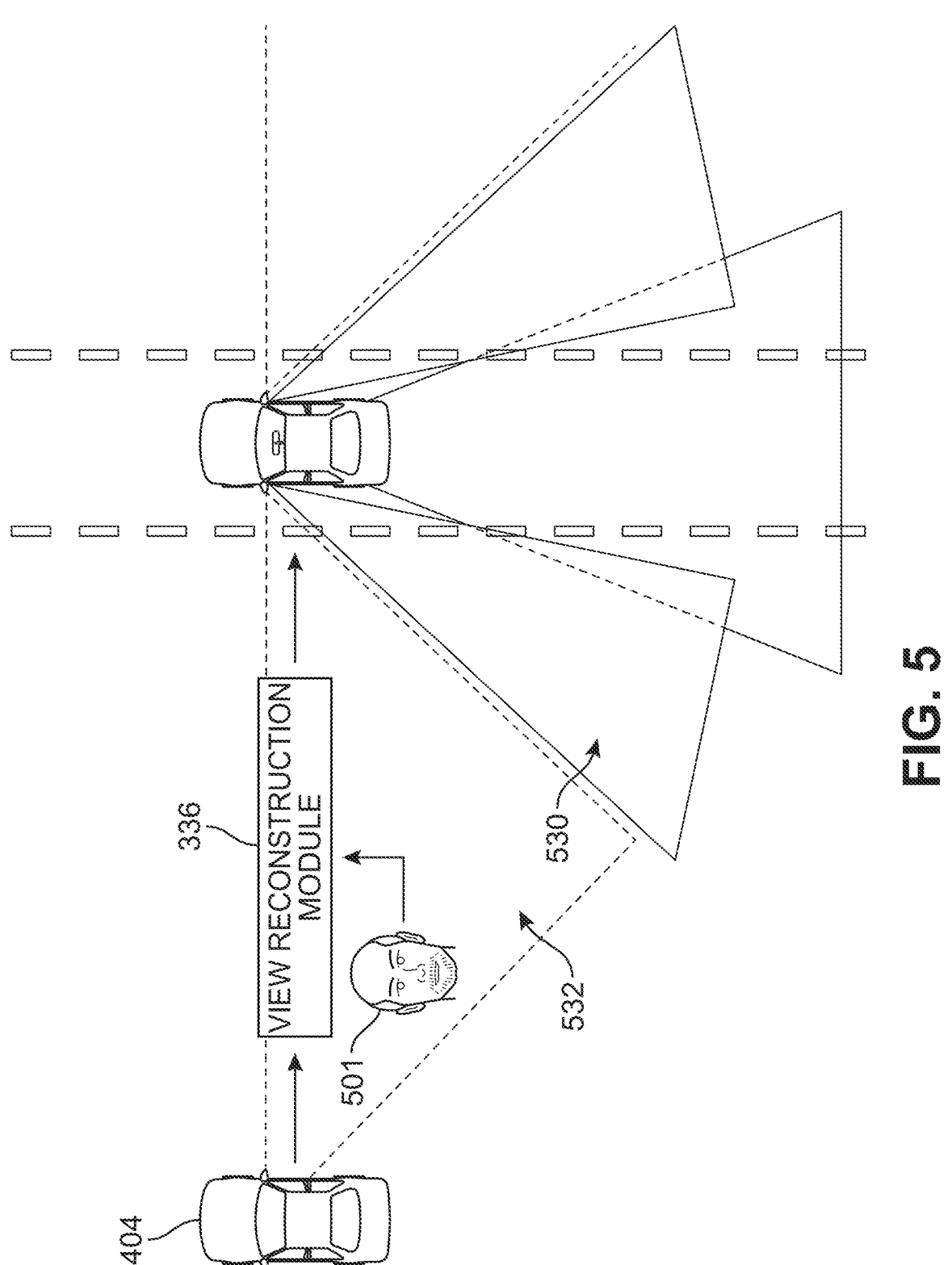
FIG. 5 is a schematic view showing the operation of a view reconstruction module, according to an embodiment.

In FIG. 5, target vehicle model 404 is provided to view reconstruction module 336. Reconstruction module 336 may be used to generate visibility zones and, corresponding, to identify non-visible zones, or blind spots, for the target vehicle. Optionally, in some cases, head data 501, which has been generated from head detection module 334, can also be provided to view reconstruction module 336.

Using model 404, view reconstruction module 336 may leverage suitable geometric optics software or ray tracing software to determine which points behind (or peripheral to) a target vehicle may be visible in the vehicle's mirrors. The collective set of points that are visible then correspond "visible zones" and the set of points behind (or to the side) of the vehicle that are not visible in the mirrors then correspond to blind spot zones (or simply "blind spots"). In FIG. 5, view reconstruction module 336 constructs a set of visible zones 530 and a set of blind spot zones 532.

The view reconstruction process may rely on having sufficiently modeled both the positions and orientations of each mirror. Additionally, the locations of various portions of the vehicle frame, such as vertically oriented pillars that separate windows, may be used since these pillars can tend to obstruct a driver's view.

The zones or regions that are visible to a driver may generally depend on the position of the driver's head and their viewing angle of each mirror. In reconstructing the visible zones that a driver may see from mirrors of the vehicle, view reconstruction module 336 may use either default positions for a driver's head and assumed viewing angles. In some cases, the location and viewing angle of the driver's head may be detected, and the detected values (head data 501) may be used in the reconstruction process. For example, view reconstruction module 336 may determine, using suitable geometric optics and/or ray tracing algorithms, what regions behind the target vehicle are visible to the driver of the target vehicle given the location of their head, as well as their viewing angle to each of the different target vehicle mirrors.

Figure 6:
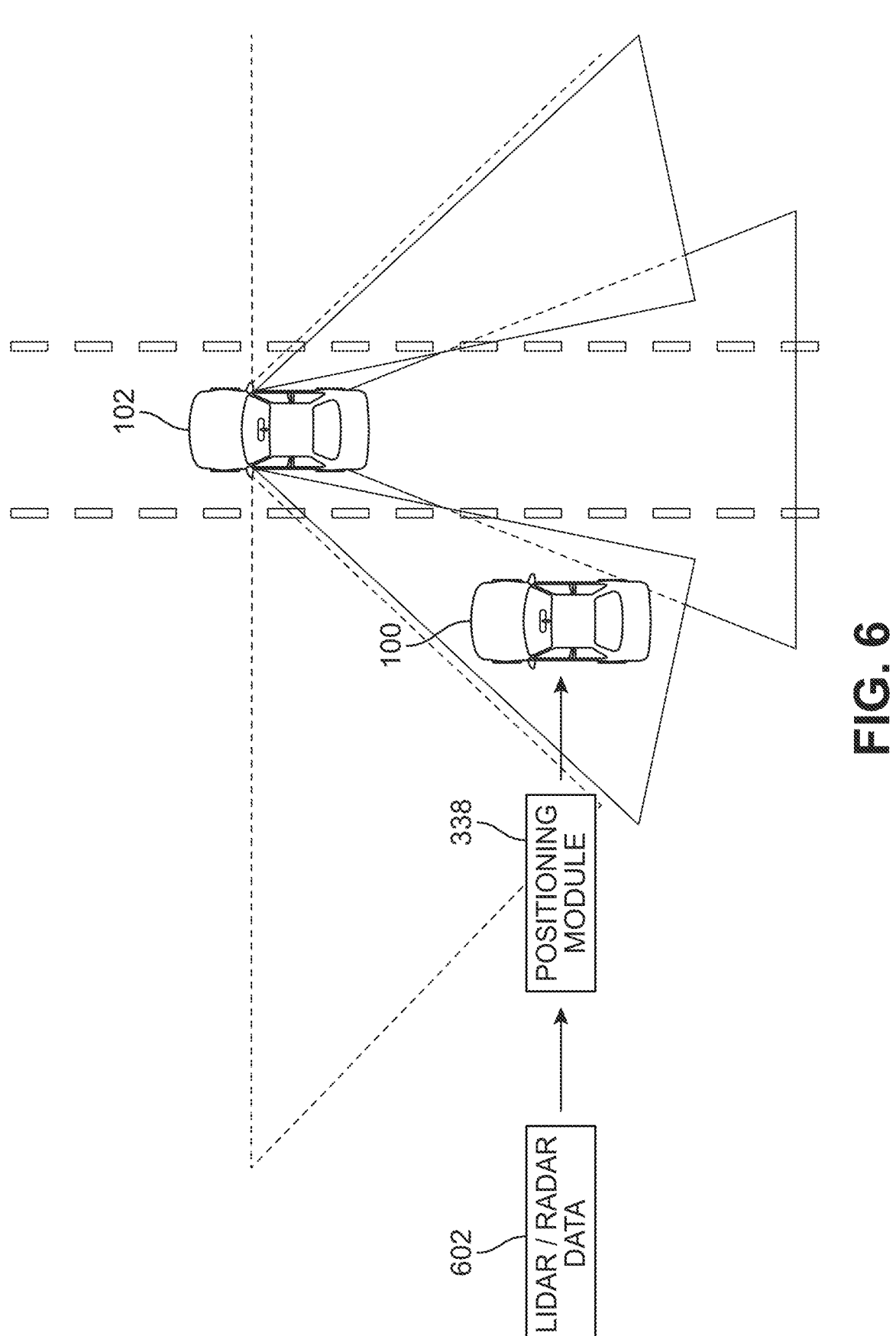
FIG. 6 is a schematic view showing the operation of a positioning module, according to an embodiment.

As shown in FIG. 6, positioning module 338 may receive and process various inputs 602 to determine the relative location of motor vehicle 100 with respect to target vehicle

102. Exemplary data that may be provided to positioning module 338 include, but are not limited to: image information, GPS or GNSS information, LIDAR and/or radar data, gyroscope information and acceleration/velocity information. In one embodiment, LIDAR data could be used to determine a relative position of motor vehicle 100 with respect to target vehicle 102 at any given moment. In another embodiment, a combination of GPS information from both vehicles, along with gyroscope information and velocity/acceleration information could be used to infer the relative locations of motor vehicle 100 and target vehicle 102.

With both the modeled blind spot zones and the relative position of motor vehicle 100 known, modeling system 330 (FIG. 3) can proceed to determine when motor vehicle 100 is inside one of the blind spot zones and further action can be taken.

Figure 7:
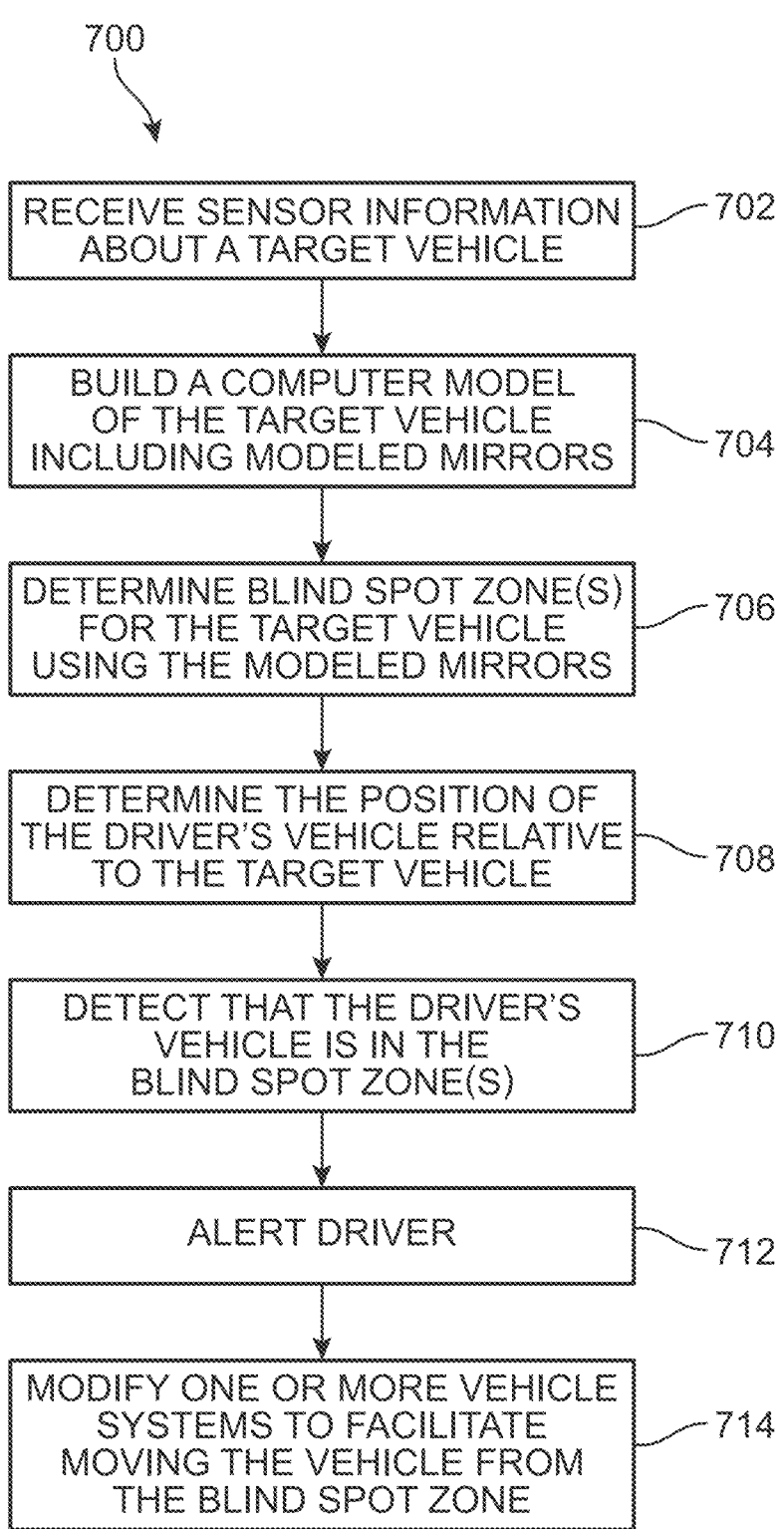
FIG. 7 is a schematic view of a process for taking action when the driver's vehicle has entered the blind spot of another vehicle, according to an embodiment.

FIG. 7 is a schematic view of a process 700 for taking action when the driver's vehicle has entered the blind spot of another vehicle. In some embodiments, one or more of the following steps could be performed by a blind spot modeling system, such as modeling system 330.

Starting in step 702, modeling system 330 may receive sensor information for the target vehicle. The sensor information could include, for example, image data, radar data, and/or LIDAR data.

In step 704, modeling system 330 could build a computer model of the target vehicle. The computer model may include modeled mirrors, which are necessary for reconstructing the visible zones and blind spots for a driver. The computer model may be constructed according to the processes described above, including detecting and classifying a vehicle and/or its parts, as well as determining specific attributes for the vehicle/parts (such as size, shape, orientation, and location).

In step 706, modeling system 330 may determine one or more blind spot zones for the target vehicle using the processes described above.

In step 708, modeling system 330 may determine a relative position of the driver's vehicle relative to the target vehicle and relative to the visible and blind spot zones of the target vehicle.

In step 710, modeling system 330 may detect that the driver's vehicle is in the target vehicle's blind spot, as in FIG. 2.

Figure 8:
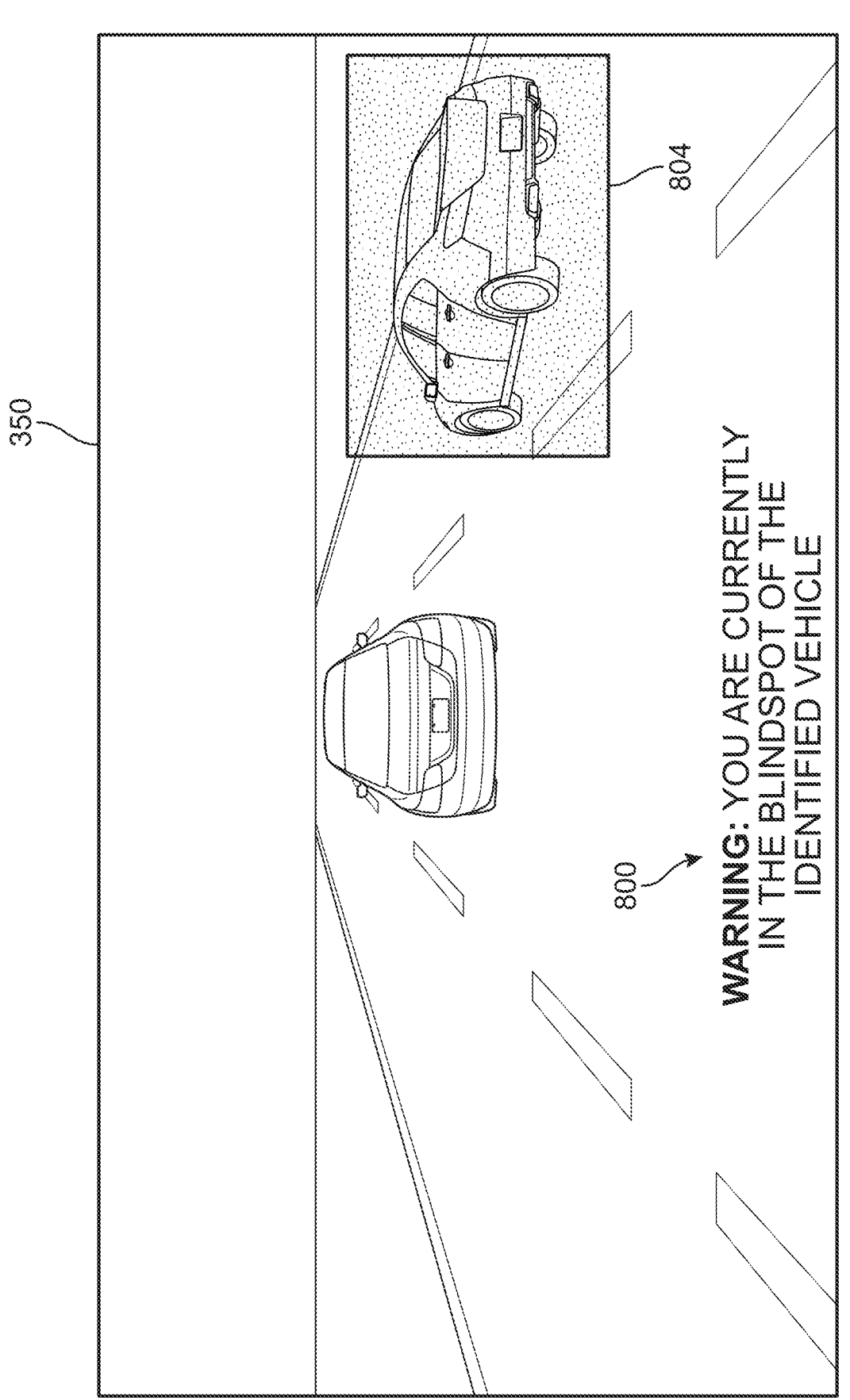
FIG. 8 shows a schematic view of vehicle display, according to an embodiment.

In step 712, modeling system 330 may alert the driver that the driver's vehicle is in one of the target vehicle's blind spot zones. As an example, FIG. 8 shows a schematic view of vehicle display 350 for motor vehicle 100. In this example, a live video feed of a forward-facing camera is shown. To alert the driver a warning 800 is shown. Moreover, because there are two vehicles shown in the feed, the relevant target vehicle 804 is highlighted. This ensures that the driver knows which vehicle is relevant for the alert.

In step 714, modeling system 330 may take one or more actions to facilitate moving the motor vehicle out of the blind spot of the target vehicle.

In different embodiments, different actions may be taken in response to detecting that a motor vehicle is within the blind spot of another (target) vehicle. As one example, a modeling system may engage vehicle systems to facilitate automatically moving the motor vehicle out of the blind spot. In some cases, the modeling system may engage a throttle by wire system of the vehicle to speed up the motor vehicle until it has moved forwards of the blind spot. In other cases, the modeling system may engage a throttle by wire system of the vehicle to slow down the motor vehicle until it has moved rearwards of the blind spot. In other cases, the modeling system may automatically engage the vehicle's brakes to slow the vehicle down. The modeling system may also engage steer by wire systems of the motor vehicle to help the vehicle move into a different lane and thus to the left, or right, of the target vehicle's blind spot.

In some embodiments where a motor vehicle includes an autonomous driving system to facilitate autonomous driving, the modeling system may engage the autonomous driving system. The autonomous driving system may then take control of the vehicle and move the vehicle out of the blind spot of the target vehicle.

The processes and methods of the embodiments described in this detailed description and shown in the figures may be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments may be stored as instructions and/or data on non-transitory computer-readable media. Examples of media that may be used for storage include erasable programmable read-only memory (EPROM), electrically erasable programmable read-only memories (EEPROM), solid state drives, magnetic disks or tapes, optical disks, CD ROM disks and DVD-ROM disks.

The embodiments may utilize any kind of network for communication between separate computing systems. A network may comprise any combination of local area networks (LANs) and/or wide area networks (WANs), using both wired and wireless communication systems. A network may use various known communications technologies and/or protocols. Communication technologies may include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network may be encrypted using conventional encryption technologies such as secure sockets layer (SSL), transport layer security (TLS), and Internet Protocol security (Ipsec).

For each of the exemplary processes described above including multiple steps, it may be understood that other embodiments some steps may be omitted and/or reordered. In some other embodiments, additional steps could also be possible.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

The invention claimed is:

1. A motor vehicle, comprising:
   one or more sensors;
   a vehicle safety system comprising a processor and memory storing instructions executable by the processor, the processor further configured to:
   receive data for a target vehicle from the one or more sensors;
   build a computer model of the target vehicle using the received data, wherein the computer model includes at least one model mirror having a modeled position and a modeled orientation;
   determine a blind spot zone for the target vehicle using geometric optics software or ray tracing software to identify, based on the modeled position and the modeled orientation of the at least one model mirror, points that are not visible in the at least one model mirror;
   determine a position of the motor vehicle relative to the target vehicle and determine that the motor vehicle is in the blind spot zone of the target vehicle; and
   modify the operation of the motor vehicle to move the vehicle out of the blind spot of the target vehicle.

2. The motor vehicle according to claim 1, wherein the vehicle safety system is further configured to identify portions of the target vehicle using computer vision.

3. The motor vehicle according to claim 2, wherein the vehicle safety system is further configured to construct the computer model of the target vehicle using the identified portions of the target vehicle.

4. The motor vehicle according to claim 3, wherein the vehicle safety system is configured to retrieve archived vehicle data for use in building the computer model of the target vehicle.

5. The motor vehicle according to claim 1, wherein the vehicle safety system is further configured to identify one or more of a make, model, or year of the target vehicle using a classifier comprising a convolutional neural network, and retrieve archived vehicle data associated with the one or more of make, model, or year for use in building the computer model of the target vehicle.

6. The motor vehicle according to claim 1, wherein the vehicle safety system is further configured to determine the modeled orientation of the at least one model mirror from sensed data captured by the one or more sensors.

7. The motor vehicle according to claim 1, wherein the motor vehicle further includes a display and wherein the vehicle safety system is further configured to send information to the display to highlight the location of the target vehicle for a driver of the motor vehicle.

8. The motor vehicle according to claim 1, wherein the vehicle safety system is further configured to detect a location and orientation of a head of a driver and use the location and orientation of the head of the driver as an input to the geometric optics software or ray tracing software to determine, based on a viewing angle from the head of the driver to the at least one model mirror, the points that are not visible in the at least one model mirror.

9. A motor vehicle, comprising:

one or more sensors;

a vehicle safety system comprising a processor and memory storing instructions executable by the processor, the processor further configured to:

receive data for a target vehicle from the one or more sensors;

build a computer model of the target vehicle using the received data, wherein the model includes at least one model mirror having a modeled position and a modeled orientation;

detect a location and orientation of a head of a driver of the target vehicle;

determine a blind spot zone for the target vehicle using geometric optics software or ray tracing software applied to the computer model of the target vehicle to identify, based on the modeled position and the modeled orientation of the at least one model mirror and based on the location and orientation of the head of the driver, points that are not visible to the driver in the at least one mirror;

determine a position of the motor vehicle relative to the target vehicle and determine that the motor vehicle is in the blind spot zone of the target vehicle; and modify the operation of the motor vehicle to move the vehicle out of the blind spot of the target vehicle.

10. The motor vehicle according to claim 9, wherein the vehicle safety system is further configured to modify the operation of the motor vehicle by engaging an autonomous driving system to automatically move the vehicle out of the blind spot of the target vehicle.

11. The motor vehicle according to claim 9, wherein the vehicle safety system is further configured to modify the operation of the motor vehicle by automatically changing a speed of the motor vehicle to automatically move the vehicle out of the blind spot of the target vehicle.

12. The motor vehicle according to claim 9, wherein the vehicle safety system is further configured to modify the operation of the motor vehicle by automatically changing a steering direction of the motor vehicle to automatically move the vehicle out of the blind spot of the target vehicle.

13. The motor vehicle according to claim 9, wherein the vehicle safety system is further configured to determine the modeled orientation of the at least one model mirror from sensed data captured by the one or more sensors.

14. A method for a safety system of a motor vehicle, the method comprising:

receiving, at a system comprising a processor and memory, data for a target vehicle from one or more sensors;

building, by the system, a computer model of the target vehicle using the received data, wherein the model includes at least one model mirror having a modeled position and a modeled orientation;

determining a blind spot zone for the target vehicle using geometric optics software or ray tracing software to identify, based on the modeled position and the modeled orientation of the at least one model mirror, points that are not visible in the at least one model mirror;

determining a position of the motor vehicle relative to the target vehicle and determining that the motor vehicle is in the blind spot zone of the target vehicle; and modifying the operation of the motor vehicle to move the vehicle out of the blind spot of the target vehicle.

15. The method according to claim 14, wherein the vehicle system is a display and wherein controlling the vehicle system includes displaying an alert on the display.

16. The method according to claim 14, wherein the vehicle system is a display and wherein controlling the vehicle system includes indicating on the display a location of the target vehicle.

17. The method according to claim 14, wherein the method further comprises detecting a location and orientation of a head of a driver of the target vehicle, and wherein determining the blind spot zone is further based on the location and orientation of the head of the driver.

18. The method according to claim 17, wherein modifying the operation includes automatically changing a speed of the motor vehicle.

19. The method according to claim 17, wherein modifying the operation includes automatically engaging an autonomous driving system.

20. The method according to claim 17, wherein modifying the operation includes automatically controlling the motor vehicle to change lanes.

*    *    *    *    *